(12) United States Patent
Palacios

(10) Patent No.: US 12,012,213 B2
(45) Date of Patent: Jun. 18, 2024

(54) ICE PROTECTION FOR ELECTRICALLY POWERED ROTORS

(71) Applicant: The Penn State Research Foundation, University Park, PA (US)

(72) Inventor: Jose Palacios, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 89 days.

(21) Appl. No.: 17/924,608

(22) PCT Filed: May 13, 2021

(86) PCT No.: PCT/US2021/032197
§ 371 (c)(1),
(2) Date: Nov. 10, 2022

(87) PCT Pub. No.: WO2021/231699
PCT Pub. Date: Nov. 18, 2021

(65) Prior Publication Data
US 2023/0174241 A1 Jun. 8, 2023

Related U.S. Application Data

(60) Provisional application No. 63/024,639, filed on May 14, 2020.

(51) Int. Cl.
*B64D 15/04* (2006.01)
*B64U 10/14* (2023.01)
(Continued)

(52) U.S. Cl.
CPC ............. *B64D 15/04* (2013.01); *B64U 10/14* (2023.01); *B64U 30/20* (2023.01); *B64U 50/19* (2023.01)

(58) Field of Classification Search
CPC ........ B64D 15/04; B64U 30/20; B64U 10/14; B64U 50/19
See application file for complete search history.

(56) References Cited

U.S. PATENT DOCUMENTS 2,576,487 A * 11/1951 Stanley ................. B64D 15/16
244/134 C
2010/0260607 A1 10/2010 Lading
(Continued)

FOREIGN PATENT DOCUMENTS

| CN | 205744310 U | 11/2016 |
|----|-------------|---------|
| EP | 0842360 B1  | 12/2000 |
| EP | 2298643 B1  | 10/2015 |

OTHER PUBLICATIONS

Yeoman K. et al, Efficiency of a Bleed Air Powered Inlet Icing Protective System, Downloaded by Pennsylvania State University on Mar. 28, 2019 | http://arc.aiaa.org | DOI: 10.2514/6.1994-717, 11 pages.

(Continued)

*Primary Examiner* — Courtney D Heinle
*Assistant Examiner* — Andrew Thanh Bui
(74) *Attorney, Agent, or Firm* — DINSMORE & SHOHL LLP

(57) ABSTRACT

An electrically powered aerial vehicle includes at least one motor where each motor includes a stator and a rotor, a motor housing having an inlet opening and a discharge opening for airflow, a plurality of rotor blades rotatable by the rotor, each of the plurality of rotor blades having a cavity running from a proximal end of the rotor blade towards a distal end of the rotor blade, and a blade hub coupled to the rotor blades at the proximal end of each rotor blade and coupled to the motor housing at the discharge opening. A chamber is defined in the blade hub and is in fluid communication with the discharge opening of the motor housing (Continued)

and the cavity of each rotor blade. The airflow is centrifugally drawn in from the motor housing through the discharge opening and transported through the chamber and into the cavities of the rotor blades when the rotor blades are rotating.

20 Claims, 5 Drawing Sheets

(51) Int. Cl.
    *B64U 30/20*    (2023.01)
    *B64U 50/19*    (2023.01)

(56) References Cited

U.S. PATENT DOCUMENTS

| | | |
|---|---|---|
| 2017/0070125 A1 | 3/2017 | Bei et al. |
| 2018/0009522 A1 | 1/2018 | Foresto et al. |
| 2020/0172259 A1* | 6/2020 | Hinderliter ............ B64D 27/16 |
| 2022/0212806 A1* | 7/2022 | Kotani ................... B64D 15/00 |
| 2022/0411075 A1* | 12/2022 | Silin ...................... B64U 20/90 |

OTHER PUBLICATIONS

Papadakis et al., Icing Tunnel Experiments with a Hot Air Anti-Icing System, Downloaded by Pennsylvania State University on Mar. 28, 2019 | http://arc.aiaa.org | DOI: 10.2514/6.2008-444, 31 pages.

Domingos et al., Computational Methodology for Bleed Air Ice Protection System Parametric Analysis, Downloaded by Pennsylvania State University on Mar. 28, 2019 | http://arc.aiaa.org | DOI: 10.2514/6.2010-7834, 15 pages.

Drury et al., Full-Scale Testing of a Centrifugally Powered Pneumatic De-Icing System for Helicopter Rotor Blades, Downloaded by Pennsylvania State University on May 2, 2017 | http://arc.aiaa.org | DOI: 10.2514/1.C033965, 9 pages.

* cited by examiner

FIG. 8
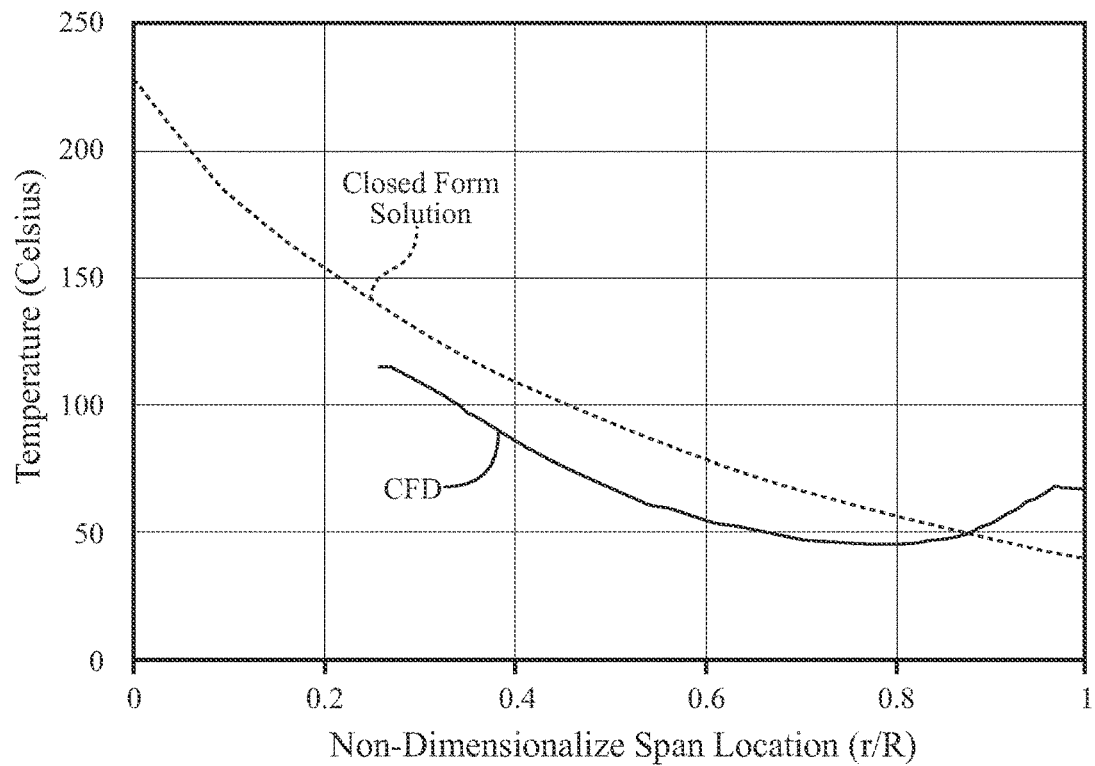
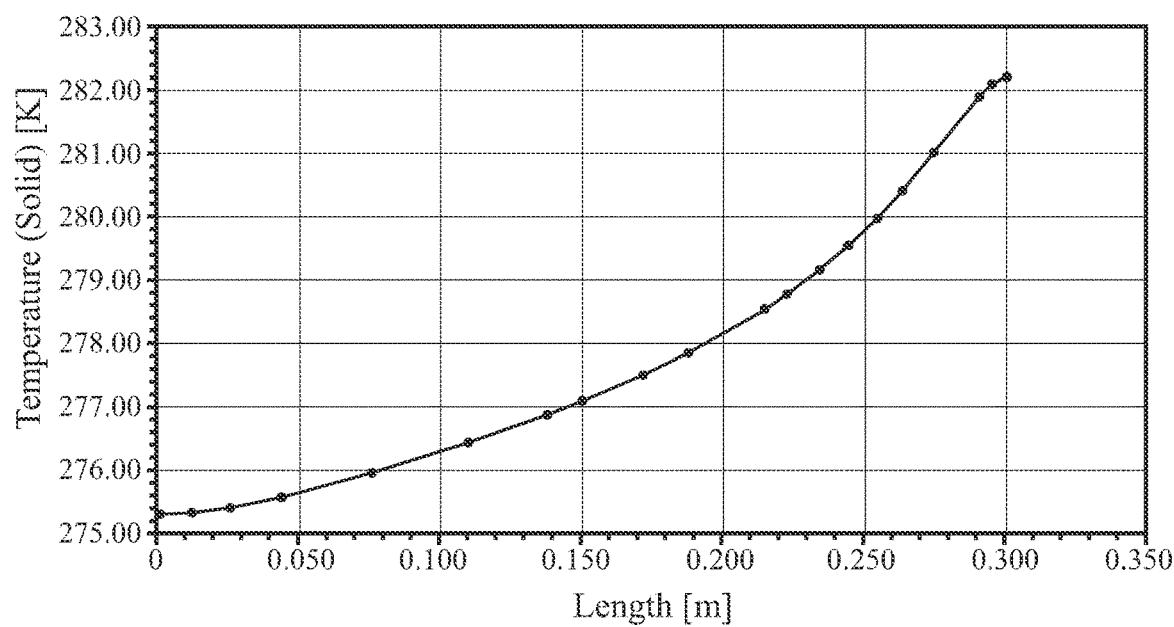
FIG. 10

ICE PROTECTION FOR ELECTRICALLY POWERED ROTORS

CROSS REFERENCES TO RELATED APPLICATIONS

This application is the U.S. National Stage of PCT/US2021/032197 filed May 13, 2021, which claims priority to U.S. Provisional Patent Application Ser. No. 63/024,639, filed May 14, 2020, the entire content of both are incorporated herein by reference in their entirety.

FIELD OF THE INVENTION

The present invention generally relates to the field of deicing rotor blades and, more particularly, to a method and system for preventing ice accretion on electrically powered rotors.

BACKGROUND OF THE INVENTION

When a rotorcraft vehicle enters an icing environment, super cooled water droplets impinge on the leading edge of the rotor blades and freeze on impact with the rotor blades. Rotor ice accretion degrades the vehicle's performance and may degrade handling qualities. The noise and vibration levels of the vehicle may be adversely affected, especially during imbalance shedding events. The problem of ice accretion is encountered more by helicopters than fixed wing vehicles given the typical mission of the helicopter. For example, urgent transportation or search and rescue operations at low altitude, high humidity environments is typical for a helicopter. Also, rotorcraft cruise speeds are generally lower than the fixed-wing vehicles, resulting in longer times subjected to icing when the rotorcraft is passing through clouds. Similarly, Unmanned Aerial Vehicles (UAV) currently being developed for urban mobility will be severely affected by these icing conditions.

UAV with multi-rotor configurations have become a popular platform for aerial surveillance and may be widely used in the delivery of packages. FIG. 1 shows a perspective view of a UAV with four rotors. While flying in a high humidity and low temperature environment, UAVs are exposed to icing conditions. Icing experiments on representative UAV configurations conducted at The Pennsylvannia State University investigated the effects of ice accretion on the operation of a UAV. The experimental results demonstrated that ice accretion on UAV rotors can lead to a large deficit in thrust and abrupt increase in power consumption that could result in catastrophic events. For example, during icing flight testing of a DJI Mavic UAV the motor current exceeded the current safety limit of the motor within 30 seconds of ice exposure (20-micron droplet size, liquid water content of 1.5 g/m$^3$). FIG. 2 shows an image of the ice accretion to the leading edges of the blades of an Unmanned Aerial System (UAS) operating in icy conditions. The ice accretion process increases the weight of the rotor(s) due to accumulated ice, which results in an increased power consumption. The increased power demand beyond the motor rating overheats the motor coils that drive the rotor during the ice accretion process, melts the insulation on the wires and destroys the motor. The test confirmed almost immediate damage to the small UAV's (under 50 Kg) motors and batteries during the brief icing process. When revolutions per minute (rpm) is maintained constant by the motor controller, increase in power and decrease in thrust are linearly correlated with the icing time. When thrust is constant, rpm and power could be modeled as a linear function of time before the ice sheds. The shedding event resulted in abrupt changes in thrust and power affecting the operating capability of the motor control algorithm. FIG. 3 shows a graph of an exemplary power increase due to ice accretion on a co-axial UAS rotor system. The graph shows of power increase on a co-axial UAS configuration at −10° C., 1.5 g/m$^3$, 10 m/sec forward speed.

Electrothermal deicing is the only system currently certified by the Federal Aviation Administration and used by the Department of Defense to protect helicopter rotor blades. Electrothermal deicing is used to melt the ice interface between accreted ice and the leading-edge erosion protection cap of the rotor, allowing the ice to be removed by the effect of centrifugal forces. Extensive ice testing of the Siskorksy-92A® conducted by Flemming et al. has demonstrated consistent performance of the thermal deicing systems for larger vehicles such as helicopters. For these types of vehicles (>4536 kg or 10,000 lbs. empty weight), ice accretion is not a major concern due to the availability of sufficient electrical power and payload to implement a robust electrothermal ice protection system, and if sufficient power margins are available, the system is designed to cope with the further increase in torque demands. Such a system requires large amounts of energy (up to 3.9 or 25 W/in$^2$) and contributes to an undesired increase in overall weight of the vehicle and cost of the blade. These costs are attributed to the integration of the ice protection system and the need for redundant power supply, controls, and slip rings for power transfer from the fixed frame to the rotor. The high-power requirement, and consequent electrical energy consumption of this system, limits the time that it can be active and the surface area that can be protected. The blade is typically segmented into different heating zones that are cycled given the available power limitations of a vehicle. Since the electrothermal deicing system melts the ice interface periodically, ice shedding occurs under centrifugal loading. Released ice patches that could reach up to 7.6 mm (0.299 inch) in thickness are a ballistic concern for some vehicles since control of the ice release azimuthal position has not been implemented to date using electrothermal deicing. The system relies on the thermal conductivity of isotropic materials to protect the leading-edge erosion cap of the blade from ice accretion. A major disadvantage of electrothermal deicing is that the electrical power required substantially exceeds the normal helicopter electrical system capacity, requiring a secondary electrical system with redundant and dual alternator features. The weight related to the required electrical power can be as large as 112 kg (245 lb) on a 4300 kg (9500 lb) gross weight helicopter. Implementing such electrothermal deicing to UAVs is not an option, since the vehicles do not have the power, space, or payload capability to carry these systems having a large weight.

Ultra-low power deicing concepts for helicopter rotors have been developed in the past. For example, a pneumatic approach to protect helicopter rotor blades from ice accretion was demonstrated by Palacios et al. The system relies on centrifugally generated pressures to deform a 0.508 mm (0.02 inch) thick titanium leading edge cap. The leading-edge cap is protected by a 10 μm (390 μinch) thick Ti—Al—N erosion-resistant coating. Beneath the titanium leading edge, six pneumatic diaphragms were installed. The diaphragms are normally deflated under vacuum against the surface of the blade and are inflated when the ice accretion thickness reaches a critical value. The deformation of the leading edge introduces transverse shear stresses at the interface of the ice layer that exceed the ice adhesion strength of the material (868 kPa, 126 psi), promoting instantaneous ice de-bonding.

Despite the great performance of the system, integration to helicopter rotor blades has not been pursued by industry given the large cost of further development of the concept and related certification costs of the new rotors. Integrating the inflatable leading edge structures on typically small chord (<4-inch chord) UAV rotor blades would be extremely challenging.

Ice protection coatings (or "ice-phobic" as they are labeled by some developers) have not shown the capability to provide sufficiently low ice adhesion strength to promote thin layers of ice to de-bond during rotation without eroding or degrading the coatings.

Thus, it is desirable to enhance the current technologies to provide a better solution in order to overcome limitations of the existing technologies.

SUMMARY OF THE INVENTION

The embodiments of the present invention provide a semi-passive, ultra-low power ice protection method and system for small electrically powered air vehicles to allow these vehicles to fly under icing conditions. The electrically powered air vehicles may be an unmanned aerial vehicle or a manned urban air mobility vehicle.

The method and system passively prevents ice accretion by convection to rotor blades that are powered by electrical motors. The ultra-low power technology uses motor thermal losses to heat the leading edge of the rotating rotor blades, preventing ice accretion. Convection is an energy transfer across a system boundary due to a temperature difference by the combined mechanisms of intermolecular interactions and bulk transport. There exist two mechanisms of convection: Free or natural convection occurs when the fluid motion is caused by buoyancy forces that result from the density variations due to variations of temperature in the fluid. Forced convection is when the fluid is forced to flow over the surface by external sources such as fans, creating an artificially induced convection current. The present disclosure employs forced convection to prevent ice accretion.

Typically, spinning rotor blades of electrical motors are cooled by the downwash created by the rotor. The motor housing is opened to allow the downwash flow to cool the motor coils via convection. In some cases, the electrical motor includes an outer stationary part and a stationary housing around the outer part. There is a rotor within the outer stationary part which rotates with a shaft. In other cases, the electrical motor has a stationary center and a moving outer part within a housing around the stationary center. In the latter case, the stationary center and the shaft don't move but the outer part and the housing rotate around the inner center. In either scenario, the stationary part is considered a stator and the moving part is considered a rotor.

The present disclosure employs a motor housing and cavities in the rotor blades to transfer air from the motor housing to the rotor blades via centrifugal pumping. The motor housing has a closed side wall meaning that the circumferential wall of the motor housing has no opening. The motor housing has a bottom side that is substantially closed. There might be an air intake inlet at the bottom side of the motor housing for drawing in cold air. The motor housing has a top side that is substantially open. There might be discharge opening at the top side of the motor housing for releasing hot air from the motor region. When the motor housing is coupled with the blade hub, a substantially closed chamber is formed inside the blade hub and the motor housing is in fluid communication with the blade hub. A majority of the heat generated in the motor region could not escape through the side wall of the motor housing and is transferred to the chamber by centrifugal pumping. The motor can be cooled convectively by pumping air across the motor coils through the chamber and into the rotor blade cavities. Each of the blades may have a cavity extending from the proximal end towards or to the distal end so that the pumped air from the motor region continues to flow into the blade cavities. The hot air from the motor region increases the temperature of the rotor blades and prevent ice accretion on the rotor blades. The motor housing may also be insulated; this will decrease time and amount of air flow required to heat up the rotor blades.

The cavity may extend partially or run a full length span-wise along a longitudinal axis of each rotor blade. The cavity may be a tubular channel. In a non-limiting example, the cavity is disposed toward the leading edge of the blades and measures less than 1/20 of a chord length of each rotor blade. As it would be known to those skilled in the art, a chord is the imaginary straight line joining the leading edge and trailing edge of an airfoil or a rotor blade. The chord length is the length of the imaginary straight line.

The cross section of the tubular channel may be circular, square, triangle or any other suitable shape. The channel may be uniform span-wise or tapered towards the distal end. Each rotor blade comprises an opening at the distal end for air outflow.

The proximal ends are connected and are in fluid communication with a blade hub. The motor housing is coupled and in fluid communication with the blade hub. When coupled with the motor housing, the blade hub forms a chamber and acts as a centrifugal pump. The chamber may be substantially sealed, meaning that at least 60% or 70% or 80% or 90% of the airflow through the motor housing, from the motor region, flows into the blade cavities. Heated air from the motor region is transferred through the chamber and into the spinning blades via centrifugal pumping. The pumping effect draws hot air from the motor coils and transports the hot air from the proximal ends to the distal ends of the blades. The hot air warms up the leading edge of the blade and prevents the ice accretion if the temperature of the leading edge is maintained above zero degree Celsius. A pre-determined volume of cold air drawn into the motor and/or the hot air transferred to the blades may be regulated using a valve.

The system is an ultra-low-power, passive, self-regulated approach to prevent ice accretion to the electrically powered rotors. As any ice accretes to the blades, torque requirements increase, which also increases the temperature of the motor, de-icing any small ice layer accreted to the blades.

In some embodiments, an additional pump may be used for drawing hot air from the motor. In a non-limiting example, if additional air flow is desired or required than is generated by the existing rotational speed of the blades, the additional pump may be activated to supplement the volume of existing air flow. In some embodiments, the blade hub has at least one cavity to prevent any ice accretion on the blade hub.

Simplified convection heat transfer calculations have been verified against computational fluid dynamics predictions with discrepancies of less than 30%. The proposed engineering tool provides the capability to conduct preliminary design of the proposed configuration and confirms the capability of the technology to maintain a rotor blade above freezing temperatures (>30° C.) at environmental conditions of −20° C.

BRIEF DESCRIPTION OF THE DRAWINGS

FIG. 8 is a graph showing the calculated temperature along the blade span;

FIG. 10 is a graph showing preliminary modeling of a spinning tube in a −20° C. environment.

DETAILED DESCRIPTION OF THE INVENTION

The electrically powered vertical take-off and landing (eVTOL) vehicle market is set to lead the implementation of future rotorcraft platforms. The motor housing on an eVTOL is typically open to allow the downwash flow to cool the motor coils via convection. The downwash flow at the root region of the blades, where the motors are located, is not efficient at removing motor heat, and motor overheating is a common problem at high torque conditions. The high collection efficiency of rotors used in eVTOL accrete ice at a higher rate than conventional rotorcraft configurations. Under icing conditions, the current needs are higher and the downwash flow is affected by the decreased aerodynamic performance related to the leading-edge ice accretion. The proposed technology provides a method to transfer heat from the motor region to the rotating blades.

According to a non-limiting configuration of the present invention, the motor would be disposed in a housing and the housing may be insulated. A blade hub holding the blades would be connected to proximal ends of the rotor blades. The blade hub forms a substantially sealed chamber when coupled against the motor housing. Each rotor blade would contain a cavity running span wise. The cavity would be opened both at the root (e.g. proximal end) and tip (e.g. distal end) of the blade. The sealed chamber would be in fluid communication with the root opening and with the discharge orifices of the motor. The fixed motor housing would contain input orifices to draw in cold air. Convection heat exchanges would remove heat from the motor and the heated air would be drawn to the blades via centrifugal pumping. The rotor blades become an element of the motor heat exchange system. Hot air flow is passively transferred to the rotor blades and heats up the rotor blades through the cavities. Hot blades prevent ice accretion if maintained above freezing temperatures.

Figure 1:
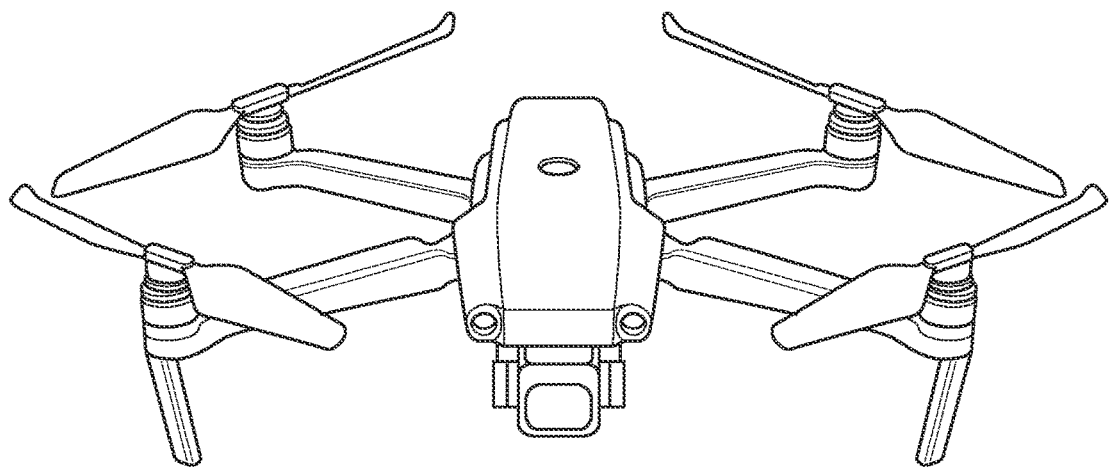
FIG. 1 shows an example of an unmanned eVTOL aerial vehicle.
Figure 2:
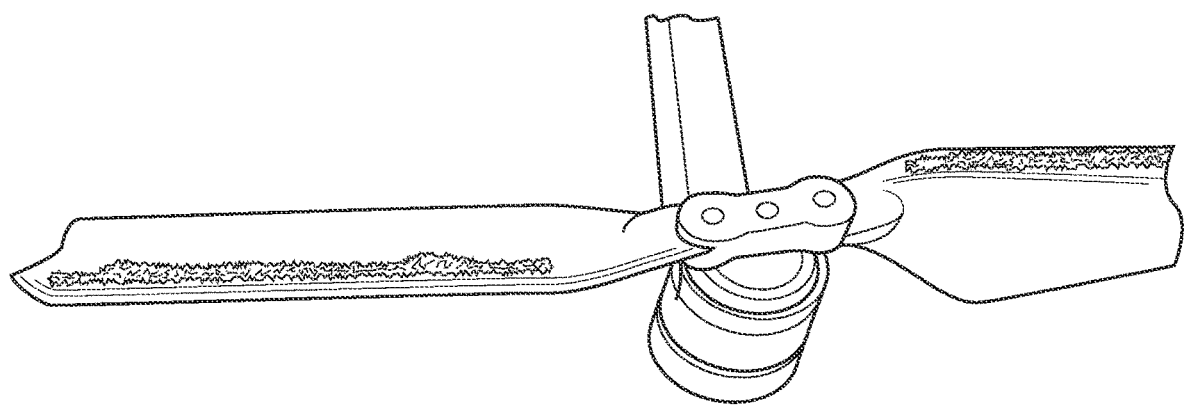
FIG. 2 shows an example of ice accretion on a leading edge of a rotor blade.
Figure 3:
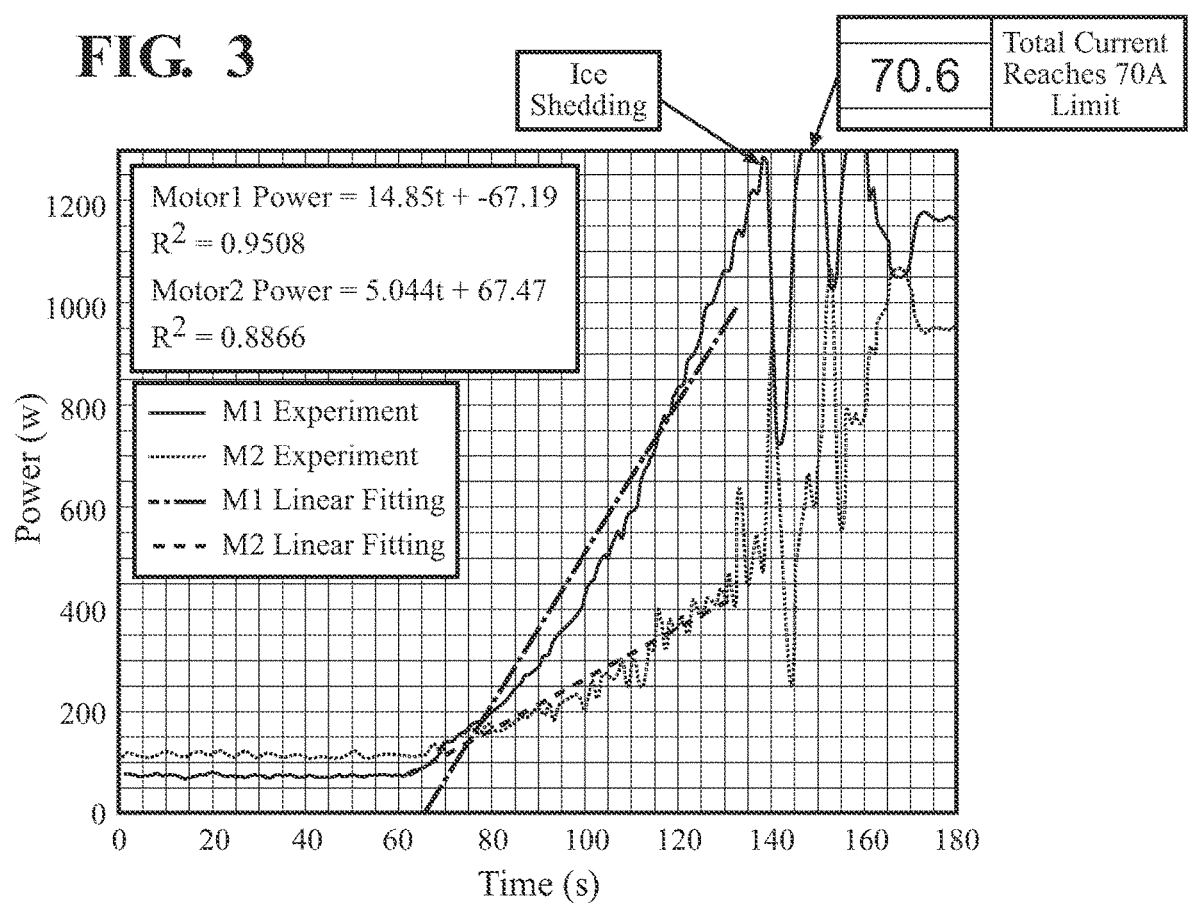
FIG. 3 is a graph showing an exemplary power increase due to ice accretion on an eVTOL rotor system.
Figure 4:
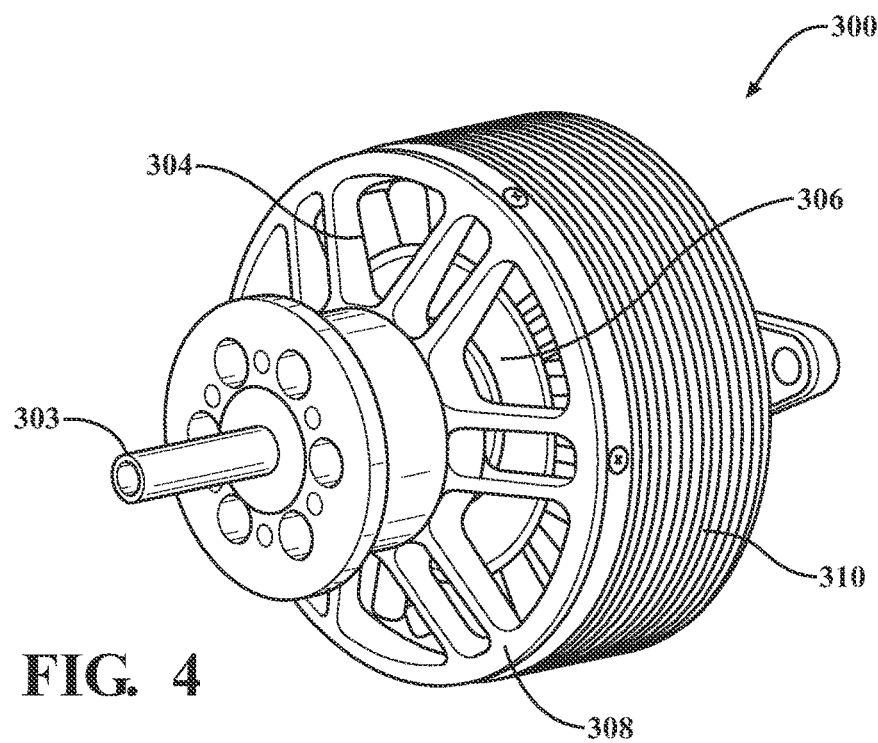
FIG. 4 shows an example of a motor.
Figure 5:
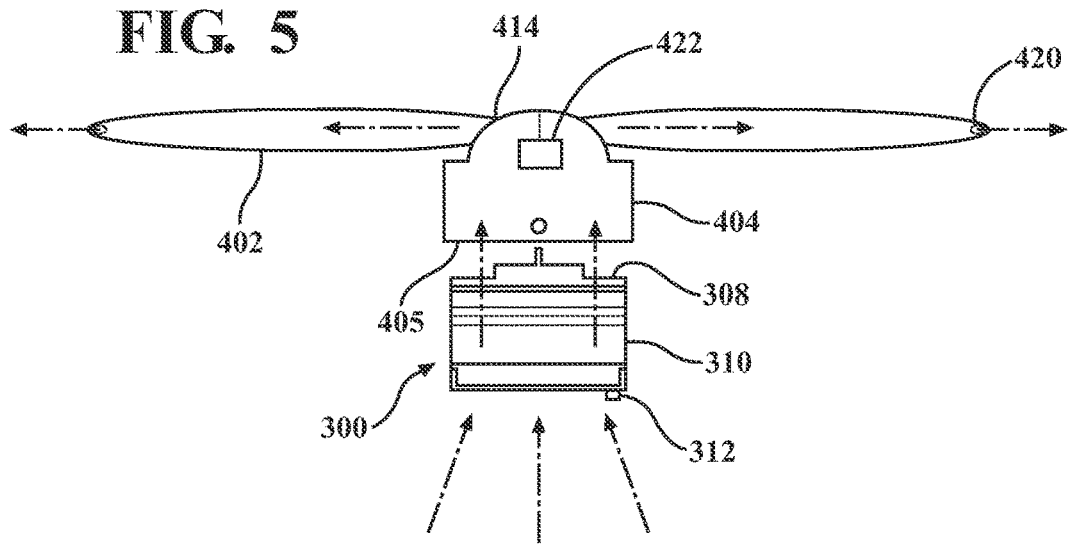
FIG. 5 is a view showing rotor blades and a motor separately.
Figure 6:
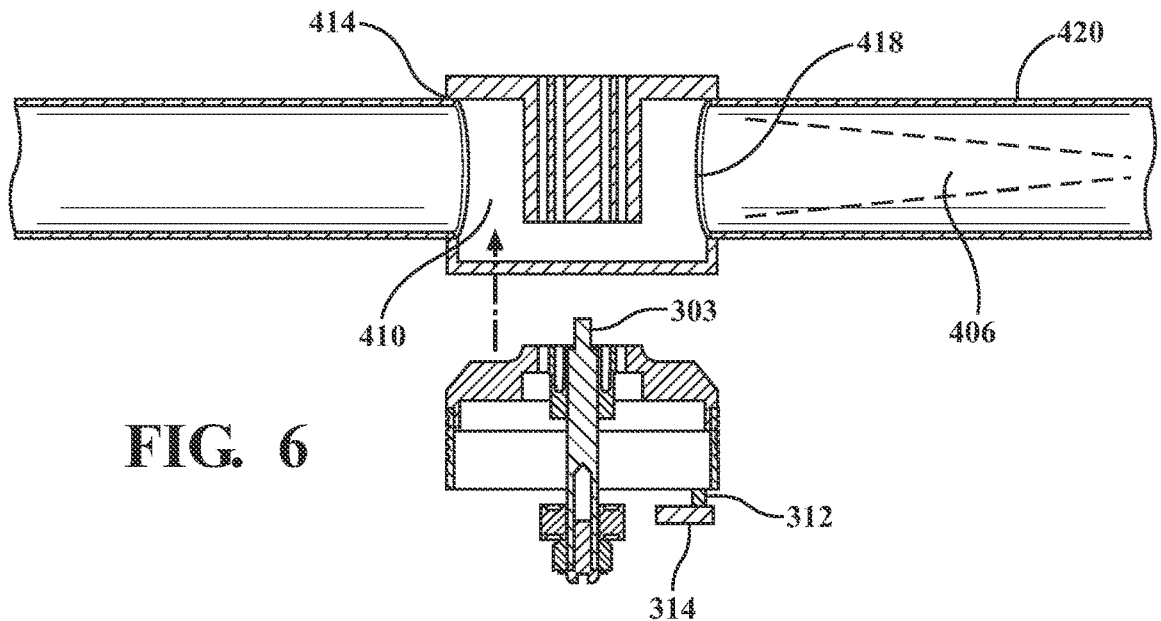
FIG. 6 is cut-away view showing the blade cavities and the motor.

An example of a motor 300 according to the present configuration is shown in in FIG. 4. FIG. 5 illustrates how the motor 300 would be coupled to the rotor blades 402. The motor 300 includes a rotor 306 that is rotatably supported in a stationary motor housing 310. The rotor 306 rotates about an axis along the shaft 303 and is contained in the motor housing 310. When the motor 300 is coupled with the blade hub 404, the lower edge 405 of the blade hub 404 is forced against the sealing gasket 308 of the motor housing, and forming a blade hub chamber 410. FIG. 6 is a simplified schematic showing the chamber 410. The chamber 410 is substantially sealed such that the majority of the air flows from the motor housing into the blade cavities, meaning that at least 60% or 70% or 80% or 90% of the airflow through the motor housing 310 flows into the blade cavities. The motor housing 310 includes a number of discharge orifices 304 and an air intake inlet 312. The air intake inlet 312 could be opened or closed by a valve 314 located in the fixed motor housing 310, as shown in FIG. 6. The valve 314 could control flow rate and flow temperature based on the motor's internal temperature. Slower flow rates would provide higher flow temperatures as the heat exchange time is increased. The motor housing 310 would be in fluid communication with the chamber 410 via the discharge orifices 304. The valve may take any form known to those of skill in the art for controlling airflow through an opening. Alternatively, a separate housing may be provided around the motor with the inlets, outlets and valve incorporated in the separate housing.

Figure 7:
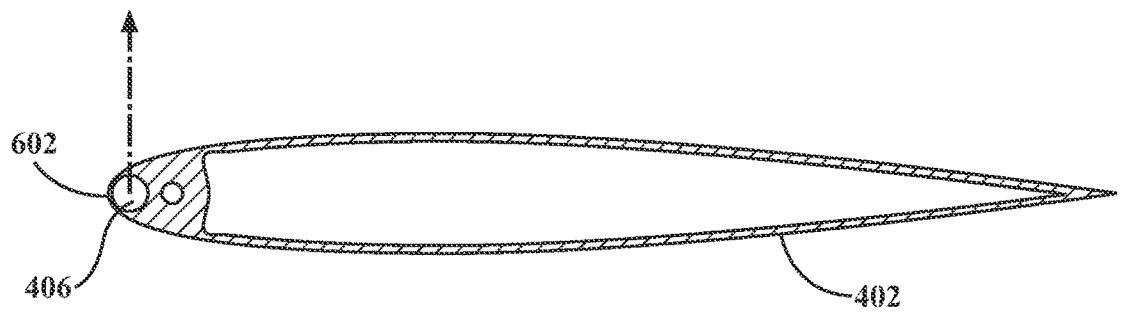
FIG. 7 is a cross-sectional view showing a rotor blade chord-wise.

As shown in FIG. 6, the rotor blades 402 are connected to the blade hub 404 at the proximal end 414 of each rotor blade 402 in a radially symmetric configuration. The rotation of the blade hub 404 would cause the rotor blades 402 to rotate as well. As the motor 300 is coupled to the blade hub 404 at the shaft 303, the rotation of the rotor 306 would transfer the rotational momentum through the shaft 303 to the blade hub 404 and cause the blade hub 404 to spin about the same axis as the shaft 303. In a non-limiting example of the present invention, each rotor blade would contain a cavity 406. FIG. 6 illustrates exaggerated blade cavities 406 in the blades. The blade cavity 406 may be a channel running span wise from the proximal end 414 to the distal end 416 of each rotor blade 402 or may extend only a partial span of each rotor blade. The blade cavities 406 would be in fluid communication with the blade hub chamber 410 via an opening 418 in the proximal end of each blade. The opening size may be tuned to provide a desired rate of airflow into the blades. The blades may further include air flow outlets 420, as shown in FIG. 5. The majority of ice accretion forms on the leading edges when the rotor blades are spinning. In a non-limiting example, the blade cavities may be located in the leading edge 602 of each rotor blade, as shown in FIG. 7, which illustrates a chord wise cross section of the rotor blade 402. The blade cavities 406 may be a tubular channel. The cross section of the channel may be circular, oval, or any other suitable shapes. The dimension of the cross section of the channel may be uniform span wise or may alternatively taper towards the distal ends of the rotor blades. An exaggerated taper is illustrated by dashed lines in FIG. 6.

When the rotor is spinning, air flow gets sucked into the motor housing 310 from the air intake inlet 312. With an insulated motor housing 310, the temperature generated in the motor region would increase. The hot air created by the motor inefficiencies flows over the motor coils and is drawn away into the blade hub chamber 410 through the discharge orifices 304 by the suction created due to centrifugal effects of the spinning blades using centrifugal pumping. The blade hub chamber 410 acts as a pneumatic slip ring to draw hot air from the motor coils and transport such air to the blades. The hot air sucked from the motor region would continue to flow into the cavities 406 of the rotor blades through the openings 418 at the proximal ends 414 of the blades 402. The hot air would flow from the proximal end 414 to the distal end 416 and warm up the rotor blades, in particular the leading edges of the rotor blades, before flowing out of the blade cavities through the air flow outlets 420. Centrifugal forces will move the air towards the tip of the blades. A pre-determined volume of cold air drawn into the motor and/or the hot air transferred to the blades may be regulated using the valve 314 located in the fixed housing 310.

The rotor blades may be made of thermally conductive materials such as metals and alloys, e.g., aluminum or titanium. Ice accretion on the leading edges of the rotor blades would be able to be melt away from the transferred heat through the rotor blades.

In summary, the thermal losses from the motor are transferred to the leading edge of the blades passively via centrifugal pumping. The leading edges of the blades are used as a heat exchange surface to cool the electrical motors of the vehicle. The hot air keeps the leading edge of the blades above zero degrees Celsius during flight. As a result, the ice protection system according to the embodiments of the present design is semi-passive, ultra-low-power and low-weight.

Preliminary modeling of the system's feasibility for the present disclosure is as discussed below. To analytically determine the capability of the proposed ice protection system, the heat transfer involved within the process is considered. Cylindrical cross flow and pipe flow are considered in the heat transfer analysis. Cylindrical cross flow is based on the airflow over the rotating blade, which would introduce convective cooling of the blade surface at typical aerial system rotor blade rpms. The pipe flow considered is due to the centrifugal forces acting on the column of air inside the blade cavity. When rotating the blade, momentum in the air column is created causing it to flow down the length of the blade towards the tip of the cavity. The flow injected at the motor housing and ejected at the blade tip will be heated as it interacts with the motor windings.

The analysis was conducted to determine blade temperatures due to the heat transfer process with the following simplifying assumptions: incompressible air flow, steady state, lack of viscous forces, minor pipe losses, constant air properties, and constant flight altitude. First, the cylindrical cross flow over the rotating blade is considered. If it is assumed that the rotor is in stagnant air then the velocity of the air over the blade will be equal to the velocity of the blade, determined as:

$$V = \frac{2\pi r \omega}{60} \quad (1)$$

where V is the velocity in m/s at a point r (radius) from the center of the rotation, and ω is the angular velocity in rounds or revolutions per minute (RPM). This calculates how fast the air will be flowing over the blade at a given span-wise position.

Next the Reynold's number is calculated:

$$Re_D = \frac{VC}{\nu} \quad (2)$$

where V is the velocity calculated by Equation 1, C is the chord of the blade over which the air is passing and ν is the kinematic viscosity of the fluid flowing over the cylinder, wherein the fluid is air.

The Nusselt number is needed to calculate the rate of heat transfer. For simplification purposes, the blade is represented by a cylinder of diameter C. The Nusselt number is equal to:

$$\overline{Nu_D} = cRe_D^m Pr^{1/3} \quad (3)$$

In Equation (3), both c and m are constants based on experimental testing available in the literature, which are a function of Reynolds number. Pr is the Prandtl number which is also a constant based on the ratio of the momentum diffusivity to the thermal diffusivity.

The convective heat transfer coefficient is defined as:

$$\overline{h_D} = \frac{\overline{Nu_D} k}{C} \quad (4)$$

where k is the heat transfer coefficient of the air and C is the diameter of the assumed cylindrical cross section.

The next step is to find the heat transfer from the cavity heated flow by the motor losses. This is done in a similar manner and starts by defining the velocity of the cavity. The assumed velocity of the flow inside the leading edge tube is:

$$V = \sqrt{\frac{\omega^2 r^2}{2}} \quad (5)$$

The Nusselt number of the cavity flow is:

$$Nu_D = 0.023 \, Re_D^{0.8} Pr^n \quad (6)$$

The constants c and m are replaced by an experimental constant related to pipe flow for the given Re. The exponential constant of the Prandtl number, n takes a value of 0.3 if the flow is warmer than the surface of the blade, and 0.4 if the flow is colder than the surface of the blade. For the ice protection process, it is assumed that the blades are below freezing and n is assumed to be constant at 0.3.

From Equation (4), the convective heat transfer coefficient due to the cavity flow is found by using the value obtained in Equation (6).

Having convective heat transfer due to convective cooling of the rotating blade and convective heating due to span-wise internal moving of the heated air, the temperature along the cavity can be calculated. Note that the heat flux through the cavity is dependent on the difference in temperature between the cavity airflow and the exterior air flow. The heat flux assumed ignores heat conduction on the blade, which would be material dependent. The heat flux is constant at each point on the cavity to enforce conservation of energy. The temperature of the cavity can be modeled as:

$$T_s(r) = T_m(r) - \frac{(T_m(r) - T_\infty) R_i}{R_{tot}} \quad (7)$$

In the equation above, $T_s(r)$ is the temperature of the surface at a point r away from the center of rotation, $T_m(r)$ is the temperature of the fluid flowing through the cavity at the same point, $T_\infty$, is the exterior temperature, and $R_i$ and $R_{tot}$ are the interior and total thermal resistances respectively. $T_\infty$, is assumed constant, i.e. the environmental temperature.

The interior resistance temperature is defined as, $$R_i = \frac{1}{A_{si} h_i} \quad (8)$$

where $h_i$ is the interior convective heat transfer coefficient which was found though the pipe flow and $A_{si}$ is the interior surface, which is simply:

$$A_{si} = \pi D_i \Delta r \quad (9)$$

$R_{tot}$ includes the combination of the outside and inside resistances:

$$R_{tot} = \frac{1}{A_{si} h_i} + \frac{1}{A_{so} h_o} \quad (10)$$

The surface temperature of the blade, $T_m(r)$ can be calculated for an assumed environmental temperature $T_{om}$:

$$\frac{T_\infty - T_m(r)}{T_\infty - T_{mi}} = \exp\left\{-\frac{r}{\dot{m} c_p R_{tot}}\right\} \quad (11)$$

where $c_p$ is the specific heat under constant pressure (constant), and m is the mass flow rate given by $$\dot{m} = \frac{2 V \pi D^2}{4} \quad (12)$$

The described calculation of the blade surface temperature, as mentioned, does not consider the conduction on the blade material or the resistance to heat transfer on the blade material. Disregarding conduction effects is acceptable for high heat transfer coefficient materials. If conduction would be considered, the heat would spread down the material forming the cavity as well as the fluid flow. This would cause the root area of the blade to be cooler, as heat is conducted towards the tip of the blade, causing the end of the blade to be warmer.

Sample Cases:

Assuming an environmental temperature, $T_\infty$, of −20° C., an initial motor temperature of 250° C., and a 10-in. (0.254 m) long rotor blade formed by a 0.525 in. (0.0127 m) radius tube spinning at 4000 RPM, the temperature along the blade span was calculated. These calculations are graphically shown in FIG. 8. Note that air properties (i.e. density, kinematic viscosity, conductive coefficient, and specific heat capability at constant pressure) were maintained constant as those values measured at 30° C. These constants are given below in Table 1. In FIG. 8, the presented predictions are compared to the computational fluid dynamics (CFD) calculation using Reynolds Averaging Navier Stokes approach.

TABLE 1

| Assumed Constants | |
|---|---|
| Blade Radius, r | 0.254 M |
| Blade Inner Radius, $r_i$ | 0.00381 M |
| Blade Outer Radius, $r_o$ | 0.00406 M |
| Angular Velocity, Ω | 418.87 rad/sec |
| Initial Fluid Temperature, $T_{mi}$ | 250 C. |
| Environmental Temperature, $T_\infty$ | −20 C. |
| Air Density, ρ | 1.164 kg/m^3 |

TABLE 1-continued

| Assumed Constants | |
|---|---|
| Prandtl, $P_r$ | 0.7282 |
| Air Kinematic Viscosity, ν | 1.61 × 10^5 m^2/s |
| Air Conductive Heat Transfer Coef. | 0.02588 W/m-K |
| Specific heat at const. pressure, Cp | 1.007 kJ/kg-K |

Less than 30% discrepancies between the Closed Form Solution and the CFD were calculated for the regions between 25% and 85%. Note that CFD predicts kinetic heating effects at the tip region as well as conduction effects on the blade material.

Figure 9:
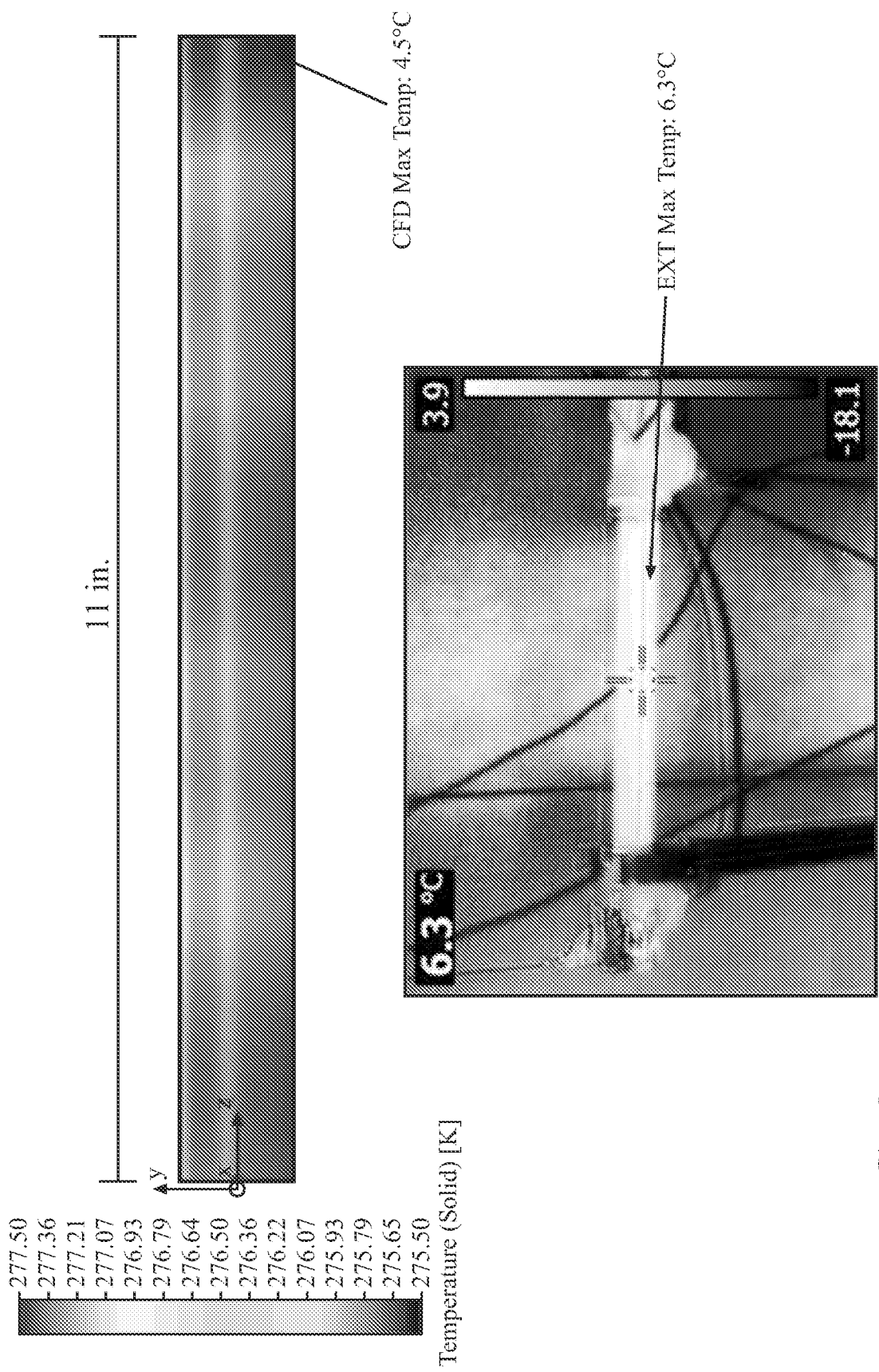
FIG. 9 is an image measured by an IR camera showing the temperature of an 11 in. long tube (1 in. ID, 0.05 in. wall thickness) with warm air at 15° C. supplied to the tube at 12 psi.

For another same case, initial CFD calculations have been conducted and compared to bench top testing. The temperature of an 11 in. long tube (1 in. ID, 0.05 in. wall thickness) was measured using an IR camera. Warm air at 15° C. was supplied to the tube at 12 psi. The initial calculations predicted the maximum temperature of the aluminum tube within 30%, as shown in FIG. 9. The, the same tube was spun in the model to mimic rotor operation. The RPM was limited to 200 and relied on the centrifugal pumping of the tube to transport the air. The temperature of the air from the motor region was assumed to be 26° C. and the environmental temperature was −20° C. With the assumed conditions, the entire rotating tube was maintained above 0° C., as shown in FIG. 10.

As will be clear to those of skill in the art, the embodiments of the present invention illustrated and discussed herein may be altered in various ways without departing from the scope or teaching of the present invention. Also, elements and aspects of one embodiment may be combined with elements and aspects of another embodiment. It is the following claims, including all equivalents, which define the scope of the invention.

The invention claimed is:

1. An electrically powered aerial vehicle, comprising:
   at least one motor, each motor including a rotor and a stator;
   a motor housing for each motor, the motor housing having an inlet opening and a discharge opening for airflow, the rotor disposed in the motor housing;
   a plurality of rotor blades rotatable by the rotor, each of the plurality of rotor blades having a cavity running from a proximal end of the rotor blade toward a distal end of the rotor blade; and
   a blade hub coupled to the rotor blades at the proximal end of each rotor blade and coupled to the motor housing at the discharge opening, the blade hub having a chamber defined therein, the chamber of the blade hub in fluid communication with the discharge opening of the motor housing and the cavity of each rotor blade,
   wherein the airflow is centrifugally drawn in from the motor housing through the discharge opening of the motor housing and transported through the chamber and into the cavities of the rotor blades when the rotor blades are rotating.

2. The electrically powered aerial vehicle according to claim 1, wherein the cavity is at a leading edge of each rotor blade.

3. The electrically powered aerial vehicle according to claim 1, wherein the cavity measures less than 1/20 of a chord length of each rotor blade.

4. The electrically powered aerial vehicle according to claim 1, wherein the cavity runs span-wise along a longitudinal axis of each rotor blade.

5. The electrically powered aerial vehicle according to claim 1, wherein each rotor blade comprises an opening at the distal end for air outflow.

6. The electrically powered aerial vehicle according to claim 1, wherein the cavity is a tubular channel or a cylindrical channel or the channel is tapered towards the distal end of each rotor blade.

7. The electrically powered aerial vehicle according to claim 1, further comprising a valve for regulating a pre-determined volume of cold air drawn into the motor and/or hot air transferred to the blades.

8. The electrically powered aerial vehicle according to claim 1, further comprising a pump for drawing hot air from the motor.

9. The electrically powered aerial vehicle according to claim 1, wherein the motor housing is insulated.

10. The electrically powered aerial vehicle according to claim 1, wherein the chamber is substantially sealed such that at least 60% or 70% or 80% or 90% of the airflow flows through the chamber from the motor housing into the blade cavities.

11. The electrically powered aerial vehicle according to claim 1, wherein the plurality of rotor blades comprises four rotor blades and the motor comprises four motors.

12. The electrically powered aerial vehicle according to claim 1, wherein at least a portion of each rotor blade is made of thermally conductive material, selected from metals and metal alloys.

13. The electrically powered aerial vehicle according to claim 1, wherein the electrically powered aerial vehicle is an unmanned aerial vehicle or a manned urban air mobility vehicle.

14. A method of deicing rotor blades of an electrically powered aerial vehicle, the method comprising:
providing an electrically powered aerial vehicle including:
at least one motor, each motor including a stator and a rotor;
a motor housing for each motor, the motor housing having an inlet opening and a discharge opening for airflow, the rotor disposed in the motor housing;
a plurality of rotor blades rotatable by the rotor, each of the plurality of rotor blades having a cavity running from a proximal end of the rotor blade toward a distal end of the rotor blade; and
a blade hub coupled to the rotor blades at the proximal end of each rotor blade and coupled to the motor housing at the discharge opening, the blade hub having a chamber defined therein, the chamber of the blade hub in fluid communication with the discharge opening of the motor housing and the cavity of each rotor blade;
increasing air temperature within the motor housing by the motor;
transporting air within the motor housing from the discharge opening into the chamber and the cavities of the rotor blades through centrifugal pumping; and
transferring heat from air in the blade cavities to the rotor blades thereby deicing the rotor blades.

15. The method of deicing rotor blades of an electrically powered aerial vehicle according to claim 14, further comprising drawing cold air into the motor via an air intake inlet.

16. The method of deicing rotor blades of an electrically powered aerial vehicle according to claim 14, further comprising regulating a pre-determined volume of cold air drawn into the motor and/or hot air transferred to the blades using a valve.

17. The method of deicing rotor blades of an electrically powered aerial vehicle according to claim 14, wherein the chamber is substantially sealed such that at least 60% or 70% or 80% or 90% of the airflow flows through the chamber from the motor housing into the blade cavities.

18. The method of deicing rotor blades of an electrically powered aerial vehicle according to claim 14, further comprising air flowing out of the rotor blade cavities via an opening at the distal end of each rotor blade.

19. The method of deicing rotor blades of an electrically powered aerial vehicle according to claim 14, further comprising drawing air from the motor housing with facilitation of a pump.

20. The method of deicing rotor blades of an electrically powered aerial vehicle according to claim 14, wherein:
the cavity is at a leading edge of each rotor blade; and/or
the cavity measures less than 1/20 of a chord length of each rotor blade; and/or
the cavity is a tubular channel, a cylindrical tubular channel or a tapered tubular channel.

* * * * *